(12) United States Patent
Perlmutter et al.

(10) Patent No.: US 8,948,193 B2
(45) Date of Patent: Feb. 3, 2015

(54) METHODS FOR INTELLIGENT NIC BONDING AND LOAD-BALANCING

(75) Inventors: Amnon Perlmutter, Givataim (IL); Benzi Waisman, Ramat Gan (IL)

(73) Assignee: Check Point Software Technologies, Ltd., Tel Aviv (IL)

( * ) Notice: Subject to any disclaimer, the term of this patent is extended or adjusted under 35 U.S.C. 154(b) by 1572 days.

(21) Appl. No.: 12/193,821

(22) Filed: Aug. 19, 2008

(65) Prior Publication Data
US 2010/0046537 A1 Feb. 25, 2010

(51) Int. Cl.
*H04L 12/56* (2006.01)
*H04L 12/947* (2013.01)
*H04L 12/803* (2013.01)
*H04L 12/935* (2013.01)

(52) U.S. Cl.
CPC .............. *H04L 49/25* (2013.01); *H04L 47/125* (2013.01); *H04L 49/3009* (2013.01)
USPC ........................................................ 370/419

(58) Field of Classification Search
None
See application file for complete search history.

(56) References Cited

U.S. PATENT DOCUMENTS

| | | | | |
|---|---|---|---|---|
| 5,237,565 | A | * | 8/1993 | Henrion et al. ............... 370/236 |
| 5,623,601 | A | * | 4/1997 | Vu ................... 726/12 |
| 5,864,553 | A | * | 1/1999 | Aramaki ....................... 370/392 |
| 6,075,786 | A | * | 6/2000 | Kunito .......................... 370/389 |
| 2005/0013300 | A1 | * | 1/2005 | Akahane et al. ............ 370/395.3 |
| 2005/0196168 | A1 | * | 9/2005 | Amemiya et al. ............. 398/45 |
| 2009/0141703 | A1 | * | 6/2009 | Ghodrat et al. ............... 370/352 |

* cited by examiner

*Primary Examiner* — Yong Zhou
(74) *Attorney, Agent, or Firm* — Mark M. Friedman

(57) ABSTRACT

Methods, devices, and media for intelligent NIC bonding and load-balancing including the steps of: providing a packet at an incoming-packet port of a gateway; attaching an incoming-port identification, associated with the incoming-packet port, to the packet; routing the packet to a processing core; passing the packet through a gateway processing; sending the packet, by the core, to the operating system of a host system; and routing the packet to an outgoing-packet port of the gateway based on the incoming-port identification. Preferably, the gateway processing includes security processing of the packets. Preferably, the step of routing the packet to the outgoing-packet port is based solely on the incoming-port identification. Preferably, an outgoing-port identification, associated with the outgoing-packet port, has an identical bond-index to the incoming-port identification. Preferably, the gateway includes a plurality of incoming-packet ports, a plurality of respective incoming-port identifications, a plurality of processing cores, and a plurality of outgoing-packet ports.

11 Claims, 5 Drawing Sheets

METHODS FOR INTELLIGENT NIC BONDING AND LOAD-BALANCING

FIELD AND BACKGROUND OF THE INVENTION

The present invention relates to methods for intelligent NIC (Network Interface Card) bonding and load-balancing.

The ability to forward data packets using link aggregation would enable optimized use of a network system's processor (as well as multiple-core CPUs). Such link aggregation would serve to balance the load of network traffic devices (e.g. firewalls, routers, switches and NICs). Current methods known in the art provide link-aggregation capabilities, but do not make optimal use of the network links and/or processor cores.

It would be desirable to have methods for intelligent NIC bonding and load-balancing.

SUMMARY OF THE INVENTION

It is the purpose of the present invention to provide methods for intelligent NIC bonding and load-balancing.

For the purpose of clarity, several terms which follow are specifically defined for use herein. The term "bonding" is used herein to refer to a process known as "link aggregation" and/or "NIC teaming". The term "interface bonding" is used herein to refer to a method to treat several physical network interfaces as a single logical interface for the purpose of high availability and optionally load sharing.

The present invention teaches methods for utilizing a bond load-sharing decision-function (for selecting a physical interface) which enables achieving the maximum gateway IP-forwarding (Internet-Protocol-forwarding) performance (under certain affinity settings).

In the Linux operating system (OS), there is a module called "bonding" which enables the binding of several physical interfaces into one logical interface called a "bond interface". Such a bond interface can provide multi-gigabit throughput using 1 Gb network cards without segmentation of the network. Examples of relevant bonding modes include IEEE 802.3ad dynamic link aggregation and XOR modes. Both modes are considered "load-sharing" modes.

The selection of a NIC during load-balancing of the physical interfaces is accomplished in some cases by performing a XOR operation on the IP addresses and port numbers (for TCP/UDP) of the packet, and then dividing the result modulo the number of physical interfaces.

We discuss a packet forwarding system architecture, as would be typical for a general packet gateway, and in particular, a security gateway. The machine includes a number of network interfaces, connected (for example) to two networks, the "internal" and the "external" network. The system employs a general purpose operating system for managing the network interfaces, for example, the Linux OS.

Consider two bond interfaces for internal and external networks that are configured with 802.3ad link aggregation. Each bond interface has the same number of physical interfaces (i.e. symmetric bond configuration). The switches that are connected to the bond interfaces are also configured with 802.3ad link aggregation. Such a configuration allows incoming traffic arriving to a switch to be load balanced at the incoming bond interface (by the switch), and load balanced again (this time, by the Linux OS) in the outgoing direction by the second bond interface. Such an arrangement implies that traffic that arrives at a specific incoming physical interface (belonging to the incoming bond interface) may be transmitted on any physical interface of the other bond interface. The arbitrary distribution of packets on the outgoing side is sub-optimal because of contention at some of the interfaces. Even if there is no contention at all (i.e. perfect equal distribution among all outgoing interfaces), the process is not optimal because of CPU affinity considerations (e.g. cache "misses" generated by the same traffic flow).

Such a bond load-sharing distribution mechanism by the Linux OS gives a lower forwarding rate for small packets (on any given NIC/core-affinity configuration setting) than if a physical interface had been determined in order to transmit for each incoming physical interface (i.e. fixed pairs of interfaces). This enables the best performance to be achieved with a proper affinity setting (e.g. assigning a different CPU core per pair of interfaces assuming there is twice the number of interfaces compared to the number of cores, or assigning two cores, which share L2 cache, per pair of interfaces, assuming the number of interfaces equals the number of cores). This new bond-decision function gives the best packet rate performance in real-world traffic applications. In addition, such a bond-decision function provides more predictable behavior when benchmarking the system.

Therefore, according to the present invention, there is provided for the first time a method for intelligent NIC bonding and load-balancing, the method including the steps of: (a) providing a packet at an incoming-packet port of a gateway; (b) attaching an incoming-port identification, associated with the incoming-packet port, to the packet; (c) routing the packet to a processing core; (d) passing the packet through a gateway processing; (e) sending the packet, by the core, to the operating system of a host system; and (f) routing the packet to an outgoing-packet port of the gateway based on the incoming-port identification.

Preferably, the gateway processing includes security processing of the packets.

Preferably, the step of routing the packet to the outgoing-packet port is based solely on the incoming-port identification.

Preferably, an outgoing-port identification, associated with the outgoing-packet port, has an identical bond-index to the incoming-port identification.

Preferably, the gateway includes a plurality of incoming-packet ports, a plurality of respective incoming-port identifications, a plurality of processing cores, and a plurality of outgoing-packet ports.

According to the present invention, there is provided for the first time a gateway device for intelligent NIC bonding and load-balancing, the device including: (a) at least two incoming-packet ports for exchanging packets; (b) at least two outgoing-packet ports for exchanging packets; and (c) at least one processing core for routing the packets, between at least two incoming-packet ports and at least two outgoing-packet ports, based on respective incoming-port identifications associated with at least two incoming-packet ports.

Preferably, at least one processing core is configured for performing security processing of the packets.

Preferably, at least one processing core is configured for routing the packets based solely on the respective incoming-port identifications.

Preferably, outgoing-port identifications, associated with respective outgoing-packet ports, have identical bond-indices to respective incoming-port identifications.

According to the present invention, there is provided for the first time a computer-readable storage medium having computer-readable code embodied therein for causing intelligent NIC bonding and load-balancing, the computer-readable code including: (a) program code for attaching an incoming-port identification to a packet at an incoming-packet port of a gateway, wherein the incoming-port identification is associated with the incoming-packet port; (b) program code for routing the packet to a processing core; (c) program code for passing the packet through a gateway processing; (d) program code for sending the packet, by the core, to the operating system of a host system; and (e) program code for routing the packet to an outgoing-packet port of the gateway based on the incoming-port identification.

Preferably, the gateway processing includes security processing of the packets.

Preferably, the program code for routing the packet to the outgoing-packet port is based solely on the incoming-port identification.

Preferably, an outgoing-port identification, associated with the outgoing-packet port, has an identical bond-index to the incoming-port identification.

Preferably, the gateway includes a plurality of incoming-packet ports, a plurality of respective incoming-port identifications, a plurality of processing cores, and a plurality of outgoing-packet ports.

These and further embodiments will be apparent from the detailed description and examples that follow.

BRIEF DESCRIPTION OF THE DRAWINGS

The present invention is herein described, by way of example only, with reference to the accompanying drawings, wherein.

DESCRIPTION OF THE PREFERRED EMBODIMENTS

The present invention relates to methods for intelligent NIC bonding and load-balancing. The principles and operation for such NIC bonding and load-balancing, according to the present invention, may be better understood with reference to the accompanying description and the drawings.

Figure 1:
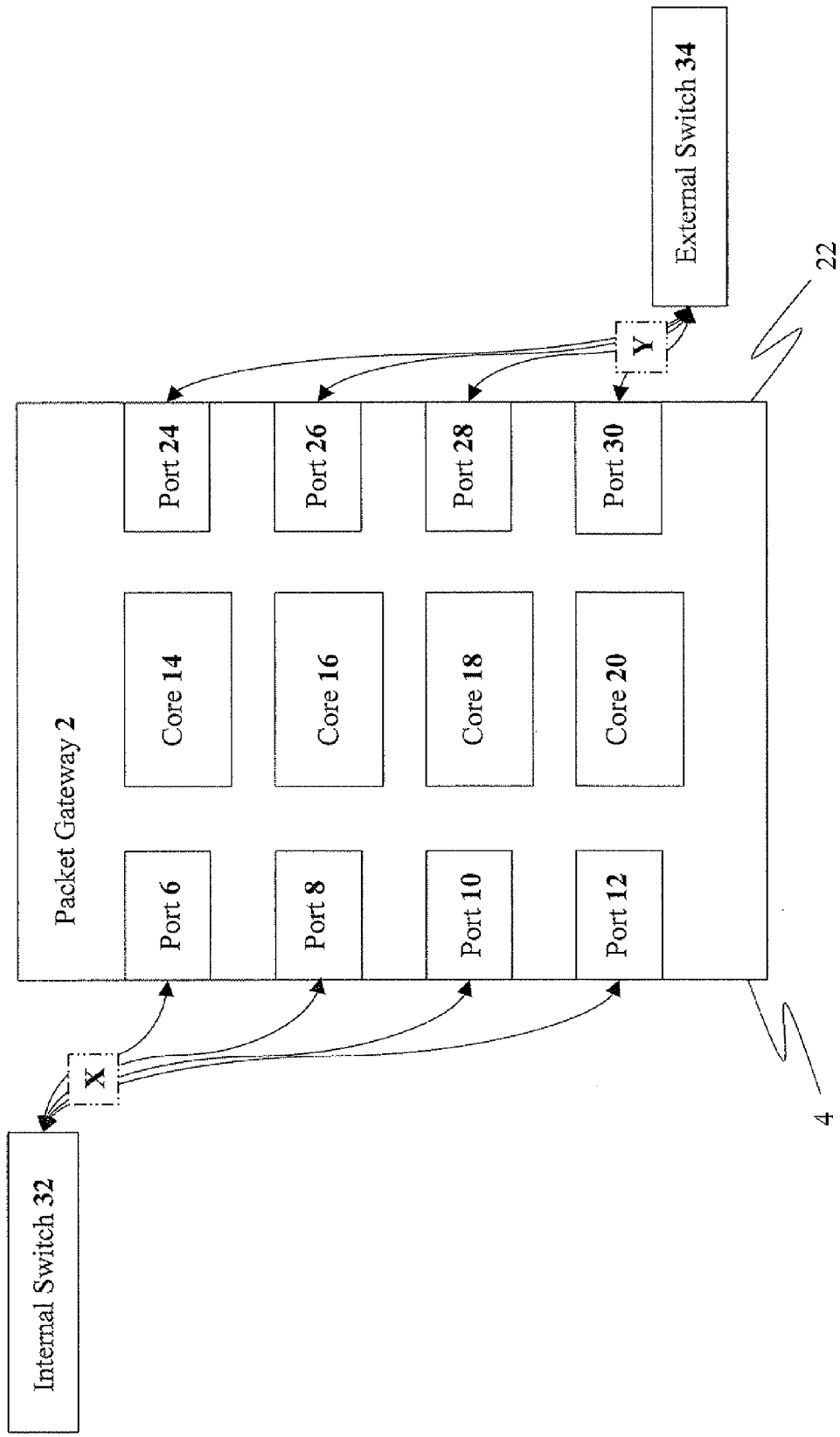
FIG. 1 is a simplified schematic block diagram of a packet gateway connected to packet switches, according to the prior art.

Referring now to the drawings, FIG. 1 is a simplified schematic block diagram of a packet gateway connected to packet switches, according to the prior art. A packet gateway 2 is shown having: an internal-bond side 4 with internal ports 6-12, CPU cores 14-20, and an external-bond side 22 with external ports 24-30. An internal switch 32 routes incoming and outgoing packets exchanged with gateway 2 on internal-bond side 4. An external switch 34 routes incoming and outgoing packets exchanged with gateway 2 on external-bond side 22. Switches 32 and 34 transmit packets to ports 6-12 and 24-30 as aggregated links. That is, ports 6-12 and 24-30 are viewed as distinct entities by switches 32 and 34 (and ensure proper load-balancing on the ports); however, switches 32 and 34 are unaware of the number of CPU cores on gateway 2. Traffic flows X and Y are shown on internal-bond side 4 and external-bond side 22, respectively.

Figure 2:
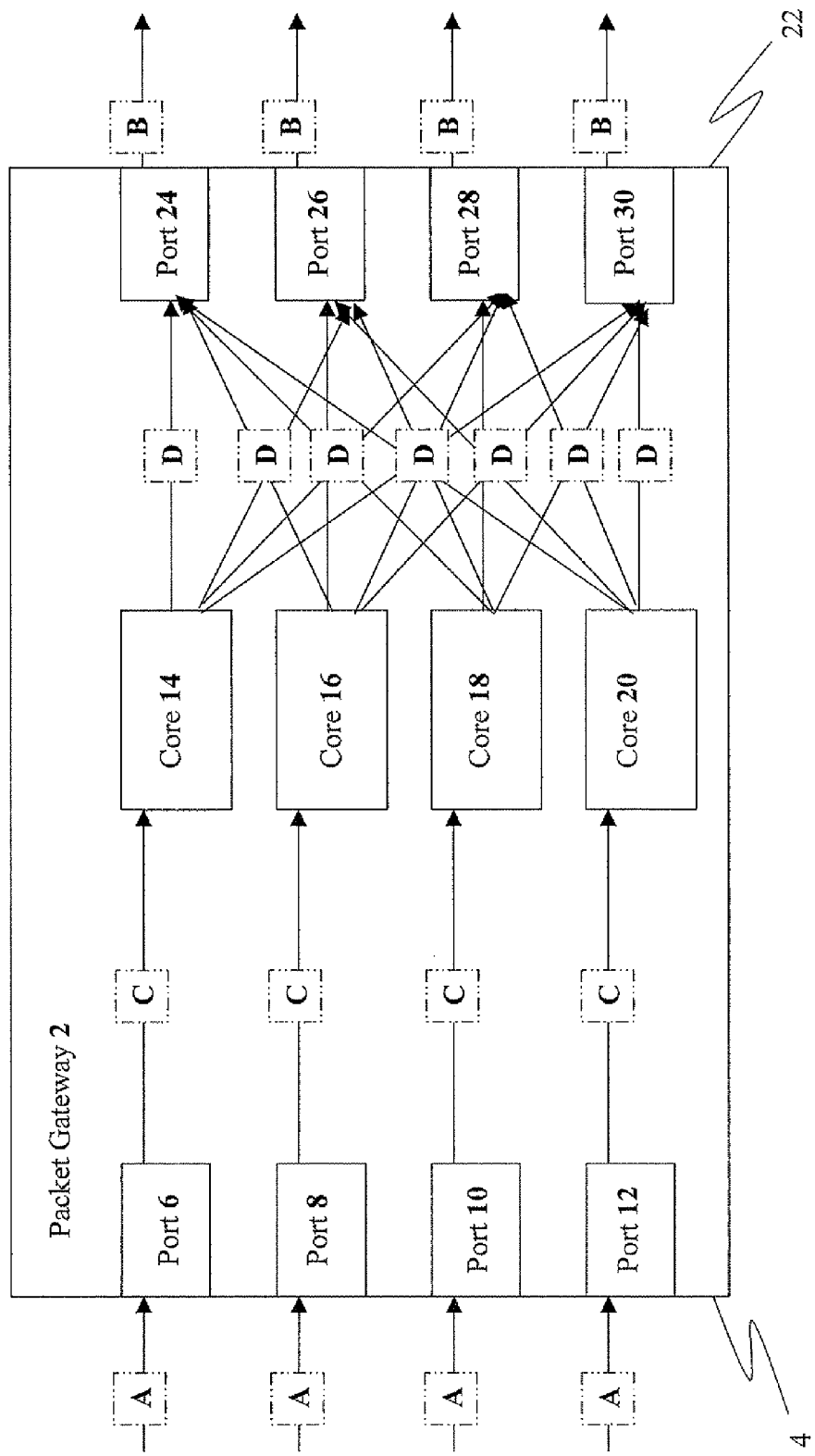
FIG. 2 is a simplified schematic block diagram of the packet gateway of FIG. 1 showing internal gateway traffic flow from the internal switch to the external switch, according to the prior art.

FIG. 2 is a simplified schematic block diagram of the packet gateway of FIG. 1 showing internal gateway traffic flow from the internal switch to the external switch, according to the prior art. For incoming packets on internal-bond side 4, port 6 is assigned to core 14 (i.e. core-to-port affinity), port 8 is assigned to core 16, port 10 is assigned to core 18, and port 12 is assigned to core 20. That is, only incoming packets have core-to-port affinity; outgoing packets are "randomized" into an arbitrary port. Packet flows A and B are shown on internal-bond side 4 and external-bond side 22, respectively. Packet flow A is one direction (left-to-right) of traffic flow X in FIG. 1, and packet flow B is one direction (left-to-right) of traffic flow Y in FIG. 1. Packet flows A and B represent traffic flow from internal switch 32 through to external switch 34.

In the prior-art bond implementation of FIG. 2, a packet received on internal port 6 will always be forwarded to core 14, but then can be transmitted to any of external ports 24-30. The bond decision-function depends on a hash result (i.e. output of a randomization algorithm) of the IP and ports of the packet. While traffic flow between internal ports 6-12 is represented by a "paired" packet flow C in FIG. 2, such a process results in a "mixed" packet flow D, indicated in FIG. 2 by the numerous communication paths designated as packet flow D.

Figure 3:
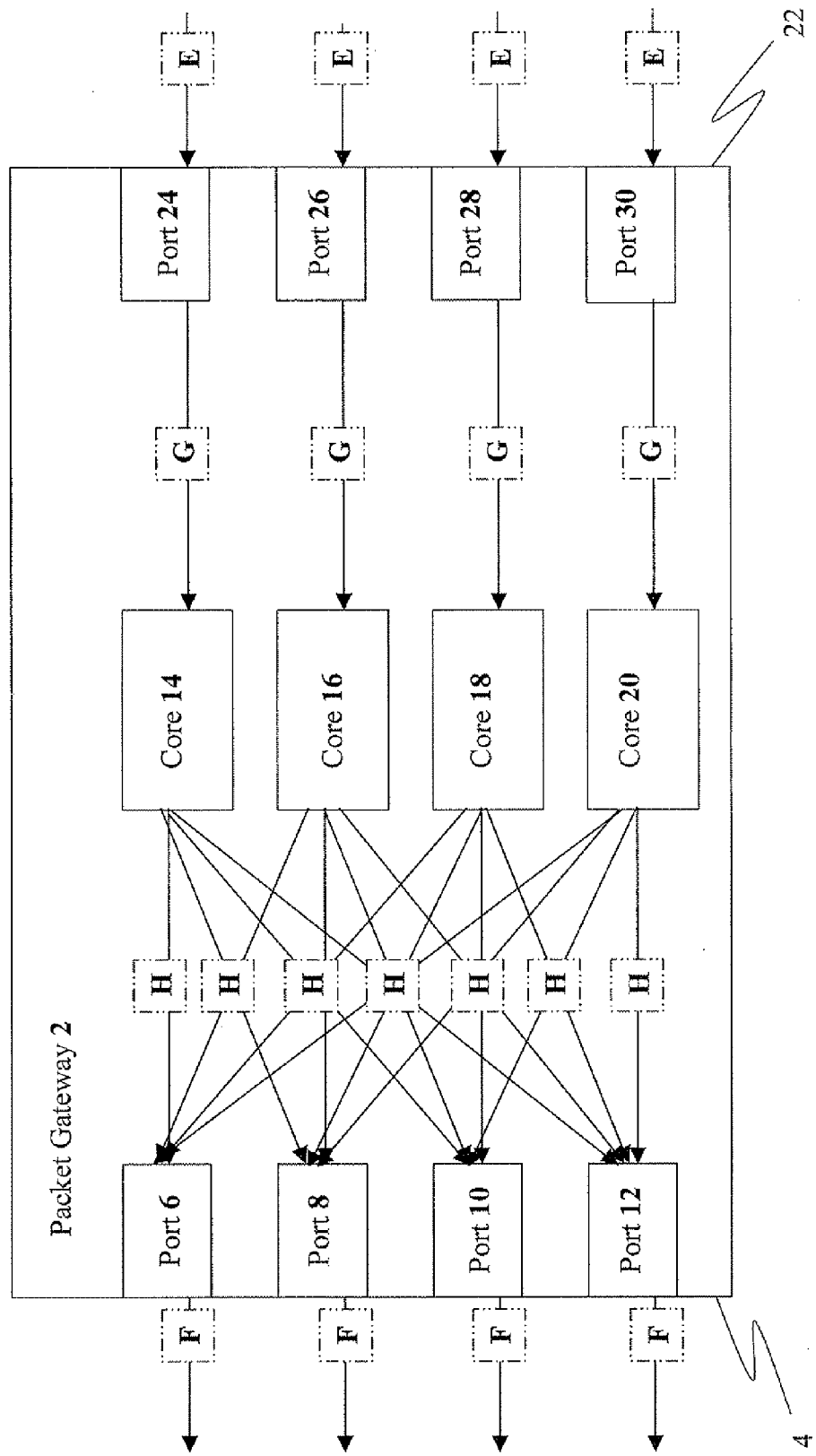
FIG. 3 is a simplified schematic block diagram of the packet gateway of FIG. 1 showing internal gateway traffic flow from the external switch to the internal switch, according to the prior art.

FIG. 3 is a simplified schematic block diagram of the packet gateway of FIG. 1 showing internal gateway traffic flow from the external switch to the internal switch, according to the prior art. For incoming packets on external-bond side 22, port 24 is assigned to core 14, port 26 is assigned to core 16, port 28 is assigned to core 18, and port 30 is assigned to core 20. Again, only incoming packets have core-to-port affinity; outgoing packets are randomized into an arbitrary port. Packet flows E and F are shown on external-bond side 22 and internal-bond side 4, respectively. Packet flow E is one direction (right-to-left) of traffic flow Y in FIG. 1, and packet flow F is one direction (right-to-left) of traffic flow X in FIG. 1. Packet flows E and F represent traffic flow from external switch 34 through to internal switch 32.

In the prior-art bond implementation of FIG. 3, a packet received on external port 24 will always be forwarded to core 14, but then can be transmitted to any of internal ports 6-12. The bond decision-function depends on a hash result of the IP and ports of the packet. While traffic flow between internal ports 6-12 is represented by a paired packet flow G in FIG. 3, such a process results in a mixed packet flow H, indicated in FIG. 2 by the numerous communication paths designated as packet flow H.

Figure 4:
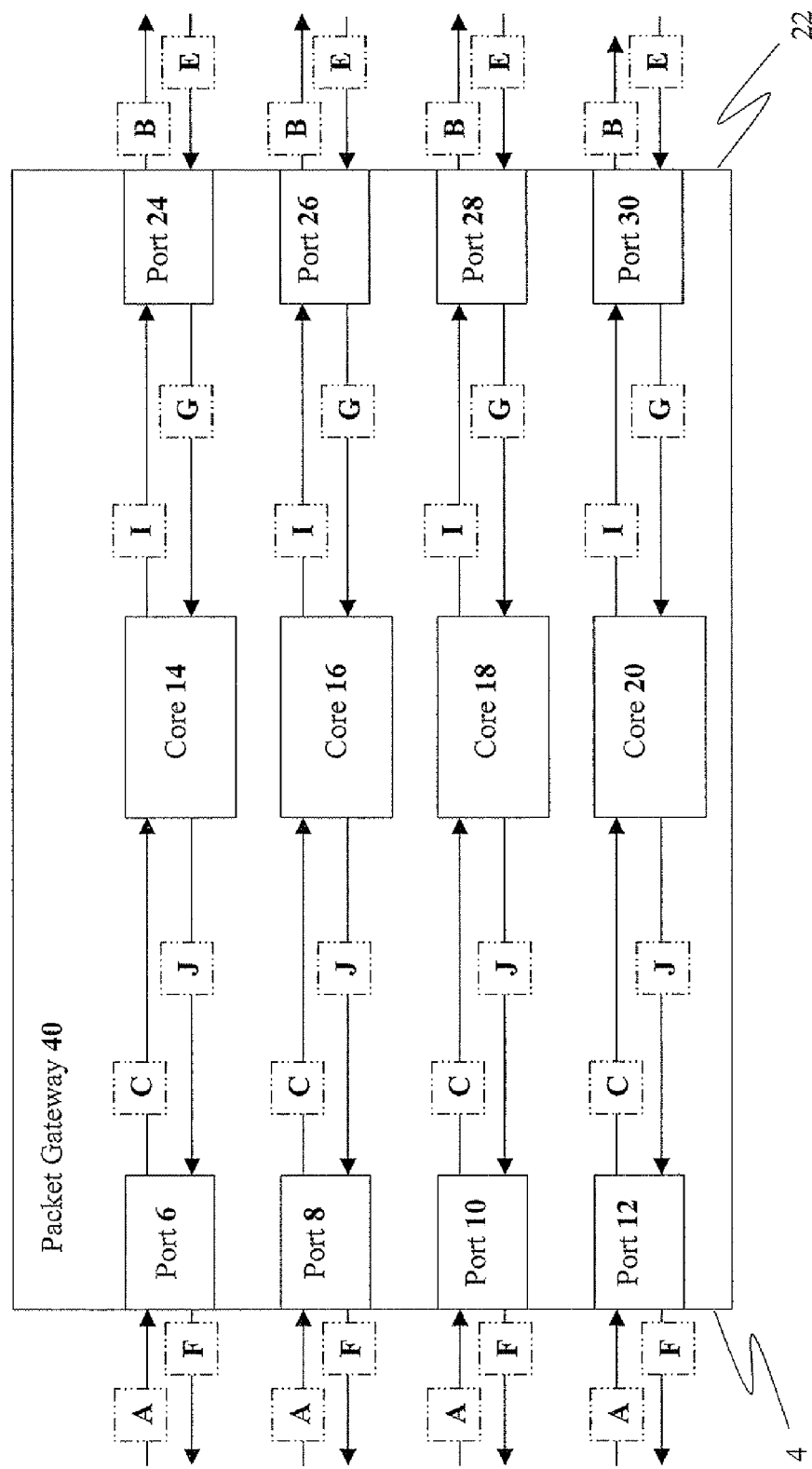
FIG. 4 is a schematic block diagram of a gateway implementing NIC bonding and load-balancing, according to preferred embodiments of the present invention.

FIG. 4 is a schematic block diagram of a packet gateway implementing NIC bonding and load-balancing, according to preferred embodiments of the present invention. A packet gateway 40 is shown having: internal-bond side 4 with internal ports 6-12, CPU cores 14-20, and external-bond side 22 with external ports 24-30. Gateway 40 can be any type of gateway that forwards packets, including security gateways. For incoming, packets on either internal-bond side 4 or external-bond side 22, ports 6 and 24 are assigned to core 14, ports 8 and 26 are assigned to core 16, ports 10 and 28 are assigned to core 18, and ports 12 and 30 are assigned to core 20. Packet flows A and B are shown on internal-bond side 4 and external-bond side 22, respectively.

It is noted that the number of slave interfaces (i.e. ports) per bond shown in FIG. 4 is four as an exemplary embodiment. It is understood that the bond implementation can be used with any number of ports in the gateway. Moreover, the number of ports need not be equal to the number of processor cores.

In the bond implementation of FIG. 4, a packet received on internal port 6 will be transmitted to external port 24 only, and vice-versa. A packet received on port 8 will be transmitted to port 26 only, and vice-versa. A packet received on port 10 will be transmitted to port 28 only, and vice-versa. A packet received on port 12 will be transmitted to port 30 only, and vice-versa. This new bond decision-function selects a fixed external physical port for each internal physical port (and vice-versa). Such a process results in paired packet flows I and J (in addition to paired packet flows C and G). There are no mixed packet flows D and H between respective ports and cores as in the schemes of FIGS. 2 and 3.

The bond decision-function basically allows the external switch to partition the traffic flows to the different interfaces, and then duplicates its decision when forwarding the packets to the interfaces on the opposite side, instead of making an independent decision.

Figure 5:
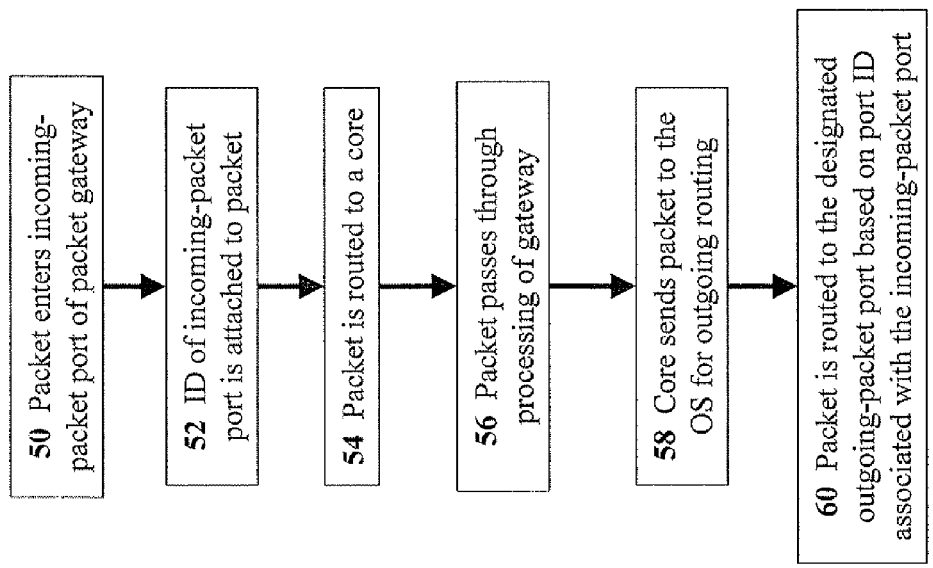
FIG. 5 is a simplified flowchart of the process steps in implementing NIC bonding and load-balancing, according to preferred embodiments of the present invention.

FIG. 5 is a simplified flowchart of the process steps in implementing NIC bonding and load-balancing, according to preferred embodiments of the present invention. The process starts with a packet entering an incoming-packet port of the packet gateway (Step 50). The ID of the incoming-packet port is attached to the packet (e.g. in the packet header) (Step 52), and the packet is routed to a core processor of the gateway (Step 54). Once the packet passes through the processing of the gateway (Step 56), the core sends the packet to the OS of the host system in order to forward the packet to an outgoing-packet port of the gateway (Step 58).

Using the incoming-packet port ID attached to the packet (which designates the incoming-packet port that the packet entered the gateway), the packet is routed to the designated outgoing-packet port (Step 60). Such a process results in paired traffic flow (i.e. packet flows C, G, I, and J) as described above with regard to FIG. 4. In preferred embodiments of the present invention, outgoing-port IDs, associated with respective outgoing-packet ports, have identical positions or indices in the bonds (i.e. internal and external bond sides 4 and 22, respectively) to respective incoming-port IDs.

While the invention has been described with respect to a limited number of embodiments, it will be appreciated that many variations, modifications, and other applications of the invention may be made.

What is claimed is:

1. A method for intelligent NIC bonding and load-balancing, the method comprising the steps of
   (a) providing a packet at an incoming-packet port of a gateway;
   (b) attaching an incoming-port identification, associated with said incoming-packet port, to said packet;
   (c) routing said packet to a processing core;
   (d) passing said packet through a gateway processing;
   (e) sending said packet, by said core, to the operating system of a host system; and
   (f) routing said packet to an outgoing-packet port of said gateway based solely on said incoming-port identification.

2. The method of claim 1, wherein said gateway processing includes security processing of said packets.

3. The method of claim 1, wherein an outgoing-port identification, associated with said outgoing-packet port, has an identical bond-index to said incoming-port identification.

4. The method of claim 1, wherein said gateway includes a plurality of incoming-packet ports, a plurality of respective incoming-port identifications, a plurality of processing cores, and a plurality of outgoing-packet ports.

5. A gateway device for intelligent NIC bonding and load-balancing, the device comprising:
   (a) at least two incoming-packet ports for exchanging packets;
   (b) at least two outgoing-packet ports for exchanging packets; and
   (c) at least one processing core for routing said packets, between said at least two incoming-packet ports and said at least two outgoing-packet ports, based solely on respective incoming-port identifications associated with said at least two incoming-packet ports.

6. The device of claim 5, wherein said at least one processing core is configured for performing security processing of said packets.

7. The device of claim 5, wherein outgoing-port identifications, associated with respective outgoing-packet ports, have identical bond-indices to respective incoming-port identifications.

8. A non-transitory computer-readable storage medium having computer-readable code embodied therein for causing intelligent NIC bonding and load-balancing, the computer-readable code comprising:
   (a) program code for attaching an incoming-port identification to a packet at an incoming-packet port of a gateway, wherein said incoming-port identification is associated with said incoming-packet port;
   (b) program code for routing said packet to a processing core;
   (c) program code for passing said packet through a gateway processing;
   (d) program code for sending said packet, by said core, to the operating system of a host system; and
   (e) program code for routing said packet to an outgoing-packet port of said gateway based solely on said incoming-port identification.

9. The storage medium of claim 8, wherein said gateway processing includes security processing of said packets.

10. The storage medium of claim 8, wherein an outgoing-port identification, associated with said outgoing-packet port, has an identical bond-index to said incoming-port identification.

11. The storage medium of claim 8, wherein said gateway includes a plurality of incoming-packet ports, a plurality of respective incoming-port identifications, a plurality of processing cores, and a plurality of outgoing-packet ports.

* * * * *